US009813431B2

(12) United States Patent
Parkinson

(10) Patent No.: US 9,813,431 B2
(45) Date of Patent: Nov. 7, 2017

(54) BROWSER INITIATED REPORTING OF FRAUD

(75) Inventor: Steven W. Parkinson, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 567 days.

(21) Appl. No.: 11/809,251

(22) Filed: May 31, 2007

(65) Prior Publication Data

US 2008/0301309 A1    Dec. 4, 2008

(51) Int. Cl.
*G06F 15/16* (2006.01)
*H04L 29/06* (2006.01)
*G06F 21/62* (2013.01)
*H04L 29/08* (2006.01)

(52) U.S. Cl.
CPC ...... *H04L 63/1416* (2013.01); *G06F 21/6272* (2013.01); *H04L 67/22* (2013.01); *G06F 2221/2101* (2013.01)

(58) Field of Classification Search
CPC ........... H04L 2463/146; H04L 63/1408; H04L 63/1483; H04L 63/1416; H04L 63/1441; H04L 63/1458
USPC .......................................... 709/229; 713/153
See application file for complete search history.

(56) References Cited

U.S. PATENT DOCUMENTS

| | | | | |
|---|---|---|---|---|
| 5,987,606 | A * | 11/1999 | Cirasole et al. | 726/11 |
| 6,842,782 | B1 * | 1/2005 | Malik et al. | 709/224 |
| 7,089,428 | B2 * | 8/2006 | Farley | G06F 21/552 726/22 |
| 7,451,487 | B2 * | 11/2008 | Oliver et al. | 726/24 |
| 2005/0108569 | A1 * | 5/2005 | Bantz et al. | 713/201 |
| 2006/0041508 | A1 * | 2/2006 | Pham et al. | 705/50 |
| 2006/0080735 | A1 * | 4/2006 | Brinson et al. | 726/22 |
| 2006/0130147 | A1 * | 6/2006 | Von-Maszewski | H04L 63/1408 726/25 |
| 2006/0253582 | A1 * | 11/2006 | Dixon | G06F 17/30864 709/225 |
| 2008/0222706 | A1 * | 9/2008 | Renaud et al. | 726/4 |

* cited by examiner

*Primary Examiner* — Evans Desrosiers
(74) *Attorney, Agent, or Firm* — Lowenstein Sandler LLP

(57) ABSTRACT

A method and apparatus for providing safety feedback to web browsers. A web browser contacts a remote server that monitors web site safety and provides a universal resource locator (URL) for a web site the client is about to access. The web site safety or tracking server checks its database for reports of issues related to the URL and provides information on any such issues. The user of the web browser can then make an informed decision about whether to continue the access of the website associated with the URL. The user of the web browser can also send reports of unwanted activities by any website. This information is analyzed and added to the database maintained by the remote server.

20 Claims, 4 Drawing Sheets

BROWSER INITIATED REPORTING OF FRAUD

TECHNICAL FIELD

Embodiments of the present invention relate to protecting users from fraudulent activity in network environments. Specifically, the embodiments of the present invention relate to a reporting, warning and blocking system and method to protect users accessing resources in the network environment.

BACKGROUND

Fraudulent activity on the Internet takes many forms. Amongst the fraudulent activities that take place are the deceptive use of websites to collect information from unsuspecting users. In some cases, criminals attempt to obtain sensitive information from users by offering websites that look like legitimate sites, either resembling the look or uniform resource locator (URL) of a legitimate site or by presenting a professional looking site offering what appear to be legitimate services.

However, these sites are facades designed to induce the user to provide sensitive data such as credit card, social security, address and similar information to the criminals. Often these sites include web forms that are used to collect the sensitive information. The data is then sent to a location accessible by the criminals that created the site. The location is typically an email account separate from the website where the criminals collect the data obtained from the users for use in fraudulent activity often relying on identity theft and misuse of credit card data.

Current security software for assisting web browsers is focused on protecting the user from unwanted viruses, trojans, malicious scripts and similar programs that are designed to infiltrate the system of the user. These security programs often scan websites and incoming data for malicious code and block the incoming data if it is detected. However, websites that collect data from the user through a standard web form do not trigger these security programs.

The security settings in a web browser take a similar approach in focusing on blocking or restricting unwanted data coming into the web browser's system. These security settings may force a user to approve the storage of cookies or the generation of a pop-up window before either will be allowed. However, these security features do not provide information about the cookie or pop-up that is to be considered. As a result, the user is forced to make an uninformed decision and ultimately is unable to take advantage of legitimate services offered or must allow actions to take place that the user is not able to know how it will affect his system. Legitimate websites use secure connections to obtain sensitive data from users. The use of a secured connection initiates a check of security certificates by the web browser and similar security checks. However, a novice user may not notice that the fraudulent website does not use secured connections that initiate such checks.

BRIEF DESCRIPTION OF THE DRAWINGS

The present invention is illustrated by way of example, and not by way of limitation, in the figures of the accompanying drawings and in which.

DETAILED DESCRIPTION

Figure 1:
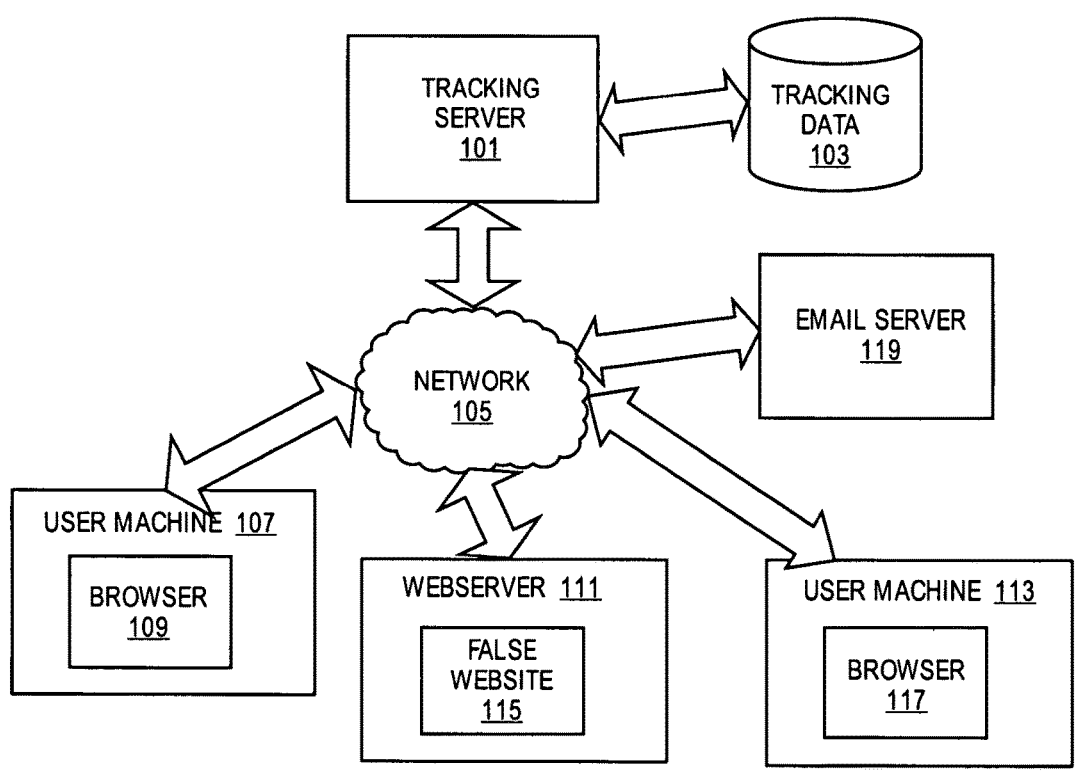
FIG. 1 is a diagram of one embodiment of a network and system including a fraud tracking and feedback system

Described herein is a method and apparatus for providing safety feedback to a client accessing a resource over a network. A client application (e.g., a web browser or similar application) contacts a remote server that monitors network resources safety and provides a universal resource locator (URL) or similar identifier for the network resource the client is about to access. The network safety or tracking server checks its database for reports of issues related to the URL and provides information on any such issues. The user of the client application can then make an informed decision about whether to continue the access of the network resource associated with the URL. The user of the client application can also send reports of inappropriate activities or characteristics of any network resource. This information is analyzed and added to the database maintained by the remote server.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention. For sake of convenience, the example of a network resource as a web site and the client application as a web browser is used frequently herein. One skilled in the art would understand that the principles described in relation to this example embodiment are applicable to other embodiments.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be born in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"), random access memory ("RAM"), magnetic disk storage media; optical storage media, flash memory devices or other type of machine-accessible storage media.

FIG. 1 is a diagram of one embodiment of a network and system including a fraud tracking and feedback system including a tracking server 101. The network 100 may include user machines 107 and 113, remote web server 111, tracking server 101, tracking database 103, email server 119 and network 105. The user machines 107, 113 may be, for example, personal computers (PCs), mobile phones, palm-sized computing devices, personal digital assistants (PDAs), console devices or similar devices capable of communicating over the network 105.

In one embodiment, the user machine 107 executes a browser 109 allowing a user to access resources over the network 105. The browser 109 may be any type of web browser including Internet Explorer by Microsoft Corporation of Redmond, Wash., Firefox by Mozilla of Mountain View, Calif. or similar browser application. The browser 109 can include a plug-in or similar software component that communicates with the tracking server 101 to report inappropriate activity associated with a resource on the network, such as a website, and to request feedback from the tracking server 101 for a designated URL or similar resource indicator. In other embodiments, other types of client applications capable of accessing network resources can be utilized including file transfer protocol (FTP) clients, peer to peer file sharing clients and similar applications. The user machines 107, 111, 113 are coupled to the network 105, which may be a public network (e.g., Internet) or a private network (e.g., a virtual local area network (VLAN)). The network 105 may be a wide area network (WAN), such as the Internet, a local area network (LAN) or similar type of network. The network 105 can support any number of user machines 107 and 113 and servers 101 and 111.

In one embodiment, the user machine 107 communicates with the tracking server 101 via a web server (not shown) or similar application or interface. For example, the user machine 107 may execute a web browser 109 that communicates with the web server using HTTP and related protocols to request and provide information between the user machine 107 and tracking server 101. The web server may then communicate with the tracking server 101. In another embodiment, the user machine 107 communicates directly with the tracking server 101 using any communication protocol and program.

The tracking server 101, which may also be referred to as a network resource safety server, collects and manages fraud reporting data from any number of user machines 107. The tracking server 101 collects and stores received fraudulent reporting activity regarding network resources in a tracking database 103. The tracking server 101 also services requests from user machines 107 for information about network resources (e.g. web server 111 and web site 115) and similar resources. The tracking server 101 receives a URL or similar indicator of a location of a network resource to be checked. The tracking server 101 checks the received location indicator against the data in the tracking database 103. The tracking server 101 then returns feedback data to the requesting local machine 107 to be presented to a user through a browser 109 or similar client application. For example, a user machine 107 intends to access a website 115 provided by web server 111. The browser 109 first contacts the tracking server 101 before accessing the website 115 to get information about the website 115.

In one embodiment, if the tracking server 101 receives an indication from a user machine 107 indicating inappropriate activity at website 115 or similar network resource, the tracking server 101 adds the received information to an entry relating to that website 115 or creates a new entry for the website 115. The tracking server 101 can access the website 115 to retrieve additional information. The tracking server 101 can analyze the website 115 data to determine a location of the web server 111, destinations of data collected by the website 115, types of data collected by the website 115, types of data the website 115 attempts to store on the user machine 107 and similar types of information related to the website 115, web server 111 and recipients of information collected by the website and web server. This additional data is added to the entry for the website 115 in the tracking database 103. In other embodiments, similar data collection activities are undertaken as appropriate to the type of network resource being monitored.

In one embodiment, the tracking database 103 may be any type of database including a relational database, object oriented database or similar type of database. In another embodiment, the tracking database 103 is distributed across multiple machines and storage devices. Any schema or organization for a database can be utilized to store the tracking data relating to websites and other network resources. The tracking database 103 can be local to the tracking server 101 or can be remote from the tracking server 101. For example, the tracking database 103 can be accessed by the tracking server 101 across the network 105.

The web server 111 can be hosted on any type of computing device including a desktop, a work station, server or similar computing device. Web server 111 or similar application may provide a resource over a network 105 such as a website 115 or similar resource. The web server 111 may be maintained by a legitimate hosting company or service. The hosting service may be unaware of any inappropriate or fraudulent activity taking place on website 115. The website 115 may have been created or in communication with a local machine 113 through a remote user using website design software or similar applications. The website 115 may include a form or similar information gathering user interface mechanism. The data collected by the form or similar interface mechanisms is forwarded to the user of the local machine 113 or an account controller by the user, such as an account with email server 119.

The website 115 is analyzed by tracking server 101 to detect any indication of fraudulent or inappropriate activity such as the forwarding of collected data to an unaffiliated location such as an email address with a different domain name from the website 115. Tracking server 101 also attempts to detect a correlation with the local machine 113 or similar data destination. In this way the tracking server 101 is able to more accurately correlate the fraudulent or inappropriate activity with the user managing or utilizing the website 115. Similar analysis can be made of the server or application providing other types of network resources.

Email server 119 can be any legitimate email server utilized by the manager of the false website 115. In another embodiment, the email server 119 may also be managed by the manager of the website 115. Those perpetrating the fraudulent activity open email accounts using false information to shield themselves from law enforcement. Any number of email servers 119 and accounts may be used by these individuals.

Figure 2:
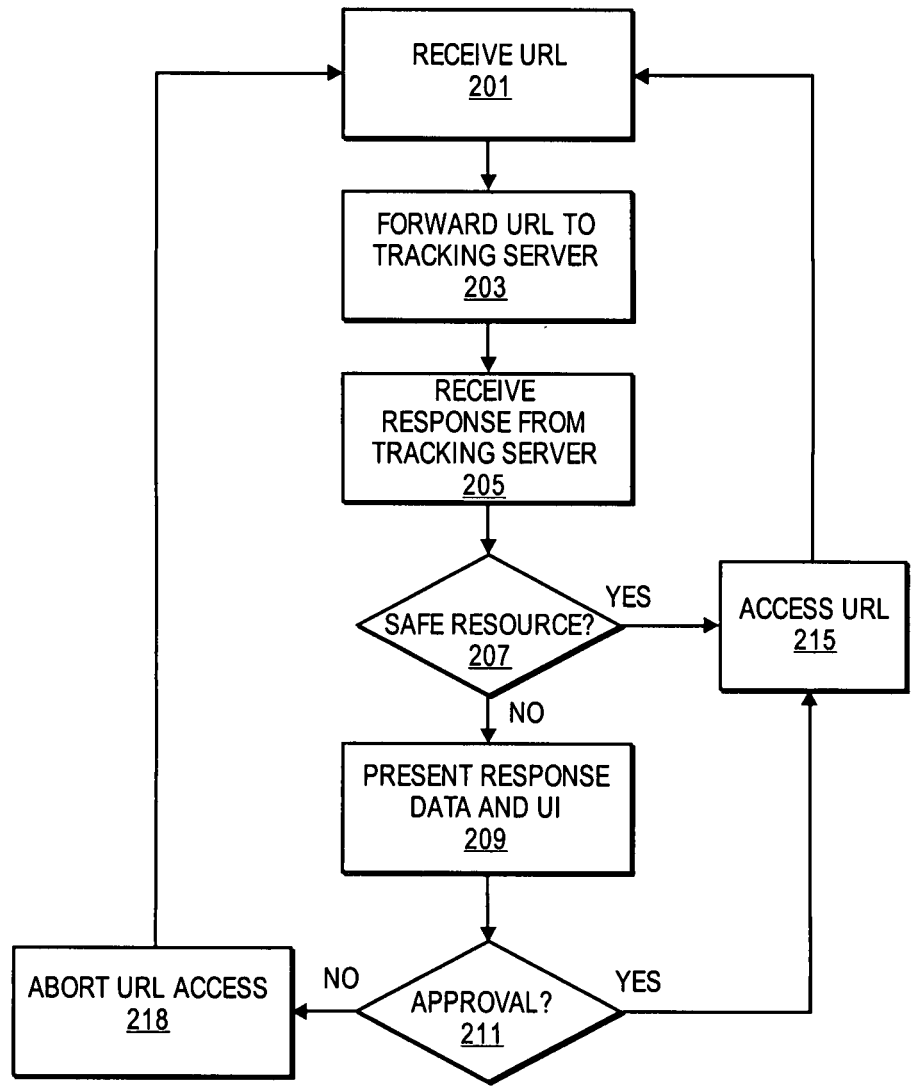
FIG. 2 is a flowchart of one embodiment of a process for obtaining resource safety feedback by a client side application.

FIG. 2 is a flowchart of one embodiment of a process for obtaining network safety feedback by a client side application. In one embodiment, the process is initiated by the tracking server receiving a URL from a client application (block 201). The URL is a locator (e.g., a URL) or similar indicator for a network resource to be accessed by the transmitting application or an indicator within a network resource to be accessed. The tracking server receives this URL from a browser, plug-in, dedicated application or similar client application. Any communication protocol can be used to establish a connection between the server and the transmitting application. The communication between the server and the transmitting application can be secured by any security protocol. The tracking server may receive a single resource indicator or may receive a set of resource locators of related information. A 'set' as used herein indicates any whole positive number of items including one item. The user machine receives these resource locator indicators from a user through an application having any type of user input mechanism including a text field, menu, hypertext links or similar input or navigation mechanism. The input of the resource indicators can be directed through a browser, plug-in, dedicated application or similar application. In one embodiment, these components can forward the resource indicator to separate component such as a plug-in or dedicated application that is responsible for communicating or transmitting the data to the tracking server. In another embodiment, the software component communicates directly with the tracking server.

In one embodiment, the resource indicator is forwarded to the tracking server (block 203) at any time after entry by the user. The resource indicator can be forwarded immediately after entry or forwarded at a pre-determined or pre-defined intervals or similar one-set times. In another embodiment, the user selects the time that the resource indicator should be forwarded. For example, a user inputs a website address in a URL text field and selects a user input mechanism requesting that the resource indicator be forwarded to the tracking server.

A response is then received from the tracking server (block 205). The response information can be in any format or transmitted using any protocol. The received information indicates a general safety of a network resource associated with the resource indicator sent to the tracking server. In one embodiment, response information may include a level of safety or similar indicator of safety. In a further embodiment, a description of the safety of the website or network resource is returned. The verbose description of the safety is based on user feedback regarding the website or network resource or an aggregate of user feedback regarding the resource. For example, if a user requests a check of a website, then a response is received detailing the type of data collected by the website and the recipient of that data, as well as, the use of the data made by the collector of the data.

In one embodiment, the browser application, plug-in or dedicated application analyzes the received data and determines whether or not the resource is safe (block 207). In one embodiment, the browser plug-in or similar component compares a received value from the tracking server such as a rating to a threshold value to determine whether or not the user considers the site safe. In one embodiment, a user response is obtained after presentation of the feedback data to the user, the response indicating that the user considers the resource safe or unsafe. In a further embodiment, the response data includes a set of values related to various safety issues as compared against a local profile managed or created by the user that details the criteria for an acceptable or safe resource.

If a resource is determined to be safe, then access to that resource is allowed to proceed (block 215). The browser application, plug-in or similar client application then proceeds along its normal operation until a further website or network resource is requested (block 201). If a requested resource is determined to be unsafe, then a warning or similar response data is presented to the user through a user interface (block 209). In one embodiment, the feedback data is only presented to a user if an unsafe resource is determined. In another embodiment, as described above, the feedback data is presented to the user to make a decision on the safety of the requested website or resource (block 211). In a further embodiment, the automated safety check proceeds without presenting the information to the user and instead makes a decision based on a safety profile defined by the user. If the user gives approval, then the resource is accessed (block 215). If the user denies approval, then the access to the resource is aborted (218). The browser, plug-in, or similar application returns to normal operation until a further network resource is requested (block 201).

Figure 3:
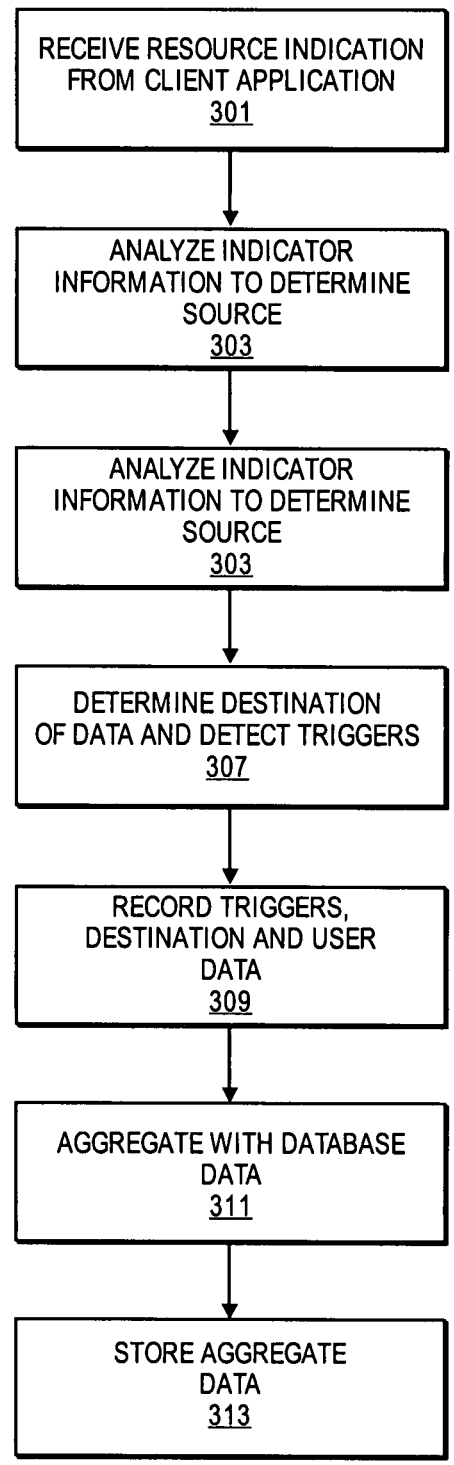
FIG. 3 is a flowchart of one embodiment of a process for providing resource safety feedback from a server side application.

FIG. 3 is a flowchart of one embodiment of a process for collecting network resource safety feedback on a server side application. In one embodiment, the process on the server side application is initiated in response to receiving an indicator from a client application (block 301). The resource indicator can be in any format including a URL, IP address, file name or similar resource indicator. The resource indicator can be received using any protocol or communication medium.

The tracking server then analyzes the received indicator to determine a source indicator (block 303). For example, if a URL is received then a domain name service look up may be made to determine the IP address of the URL. After the source has been determined, the server accesses the location and retrieves the data at the location (block 305). For example, a tracking server may access a website at a designated IP address or URL and retrieve the first page or any number of pages associated with that website or IP address. In one embodiment, the server may crawl or similarly traverse a website to obtain the data therefrom. Similar techniques can be employed for other network resources. The retrieved data is then analyzed to determine the data collected from users by the website or similar network resource and the destination that the collected data is sent to (block 307). For example, a website may include a web form or set of web forms whose data is sent by an electronic message to a specific IP address or email address. The tracking server also analyzes the retrieved data to detect other triggers in the data. A trigger is any information or data that indicates an inappropriate activity or data collection by the website or resource. In a further embodiment, the website is searched or traverse to determine a managing user or creator, design software, creation data and similar website construction. Other network resources can be similarly analyzed to determine analogous information.

The detected triggers, user data destinations and similar collected data are recorded in the tracking database. Each of the detected triggers, user data or destinations can be recorded as a separate entry or stored in a set of entries associated with the resource locator indicator. The recorded data can be aggregated with data already present in the database (block 311). Data aggregation includes adding new data and feedback into the already existing data, merging data values and similar aggregation techniques. The aggregated data is then stored in the tracking database (block 313). The stored data is then stored in any format according to any schema including a relational database schema, object oriented or similar database format.

Figure 4:
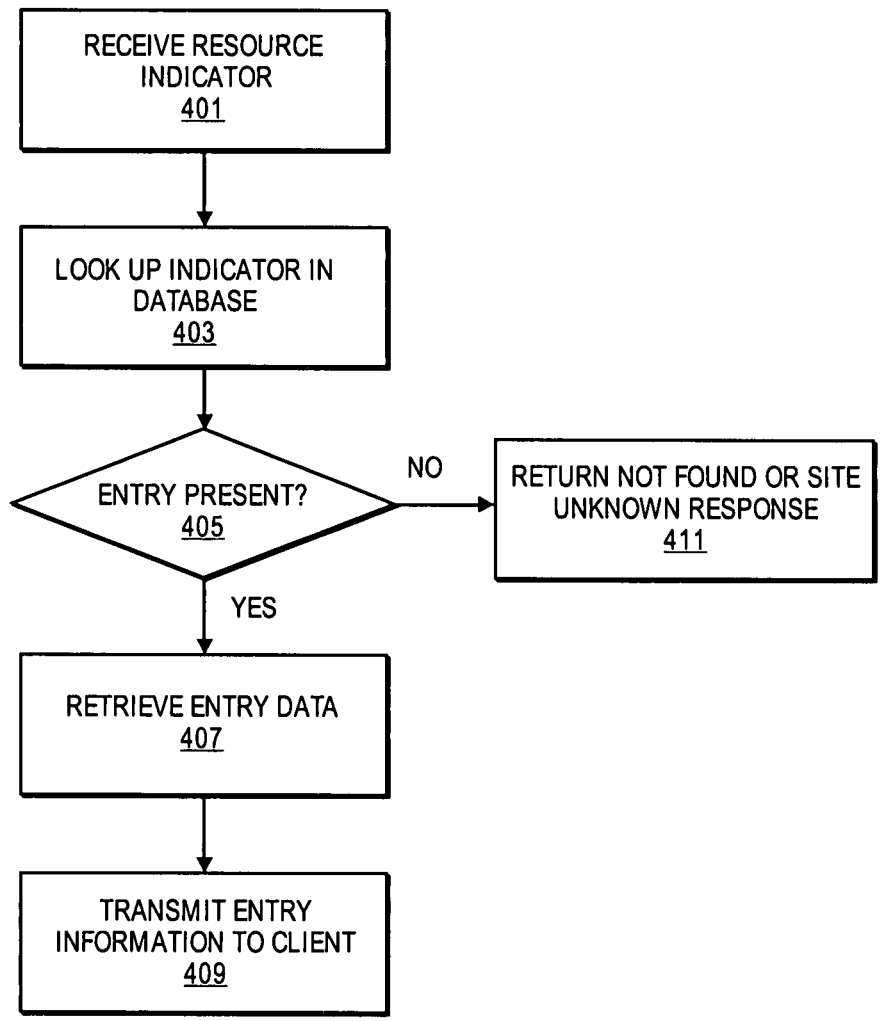
FIG. 4 is a flowchart of one embodiment of a process for processing fraudulent activities and other unwanted activities by a website.

FIG. 4 is a flowchart of one embodiment of a process for processing fraudulent activities and other unwanted activities by a website. In one embodiment, this process is initiated by the server receiving a URL or similar resource indicator from a client application on a user machine (block 401). The URL or resource indicator can be received over any communication protocol or medium and can be accompanied by any other data related to the resource identified by the URL or resource indicator. The received resource indicator is utilized to form a look up or search operation to be applied to the tracking database (block 403). The resource indicator can be used as a key or a search term to perform the look up or search operation on the database. Any other received data can also be utilized to perform the look up or the search operation on the database. The server then determines if an entry is present by analyzing the return data of the search or look up operation (block 405). If an entry for the identified resource is not present, then a response is sent to the client that generated the request that no information was found or the site or resources is unknown (block 411). An entry for the resource can be generated for the requested information and notated with any known information related to the site or resource. The data is then stored as a new entry. In one embodiment, the tracking database analyzes the requested resource and generates a new entry for the resource in the database and then re-performs the look-up operation.

If an entry was determined to be present then the entry data is retrieved (block 407). The retrieved data can be filtered or utilized to retrieve additional data or similarly utilized to find additional related data. For example, the data can be formatted to be presented to a user in the form of a text message or verbose description of the requested resource. After the data has been retrieved and processed or formatted into the appropriate message type, then the data is transmitted to the requesting client application (block 409). The data can be transmitted in any format or according to any protocol. The receiving client then analyzes and presents the data to the user.

While the machine-accessible storage medium is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories and optical and magnetic media.

Thus, a method and apparatus for providing a security check against malicious websites and network resources have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
receiving, at a processing device, a source indicator from each of a plurality of remote client applications, wherein the source indicator comprises a first address of a website;
determining a first domain name for the website in view of the first address;
accessing the website using the source indicator to retrieve one or more pages associated with the website;
traversing the one or more pages to extract user information collected by the one or more pages and a second address comprising a destination email address including a second domain name to which the one or more pages send the user information;
in response to determining the second domain name is different than the first domain name, detecting, by the processing device, from each of the plurality of remote client applications, a respective indication of a fraudulent activity, wherein the fraudulent activity comprises forwarding the user information to the second address;
storing, by the processing device, the respective indications of the fraudulent activity in a database associated with the website and aggregating the respective indications with previously received indications of the fraudulent activity from other remote client applications;
generating, by the processing device, a value representing a level of safety associated with the website, the value generated in view of the aggregated indications of the fraudulent activity;
providing, by the processing device, the value representing the level of safety associated with the website to one of the plurality of remote client applications, the one of the plurality of remote client applications to compare the value with a user-created profile to determine whether the website is safe; and providing, by the processing device, a description of the fraudulent activity for the website derived from data provided by the plurality of remote client applications.

2. The method of claim 1, further comprising:
traversing, by the processing device, the website to identify the second address.

3. The method of claim 1 further comprising retrieving additional information associated with the website, wherein the additional information about the fraudulent activity comprises at least one of a location of the website, the destination of data collected by the website, types of data collected by the website, or types of data the website attempts to store on a user machine.

4. The method of claim 1, further comprising:
preventing access to the website in response to a negative fraud report.

5. The method of claim 1, further comprising:
altering a graphical user element in the client application to indicate fraudulent activity for the website.

6. A method comprising:
receiving, at a processing device, a uniform resource locator (URL) from a client application over a network, the URL having a first domain name;
accessing, by the processing device, a website associated with the URL to retrieve one or more pages associated with the website;
traversing the one or more pages to extract user information collected by the one or more pages and a second address comprising a destination email address including a second domain name to which the one or more pages send the user information;
in response to determining the second domain name is different than the first domain name, adding an indication of fraudulent activity to an entry for the website in a database, wherein the database comprises aggregated user feedback from a plurality of client applications on the network and aggregated indications of fraudulent activity;
looking up the URL in the database to determine fraudulent activity associated with the URL, wherein the fraudulent activity comprises forwarding the user information to the second address;
generating, by the processing device, an indicator of fraudulent activity representing a level of safety associated with the URL, the indicator generated in view of the aggregated user feedback and the aggregated indications of fraudulent activity;
returning, by the processing device, the indicator of fraudulent activity representing the level of safety associated with the URL to the client application over the network prior to access of the URL by the client application, the client application to compare the indicator with a profile created by a user to determine whether the URL is safe; and
returning, by the processing device, a description of the fraudulent activity for the URL derived from the aggregated user feedback provided by the plurality of client applications.

7. The method of claim 6, further comprising:
altering a graphical user element in the client application to indicate fraudulent activity for the URL.

8. The method of claim 6, further comprising:
generating a pop-up to display information about fraudulent activity.

9. The method of claim 6, further comprising:
preventing access to the website associated with the URL in response to a negative fraud report.

10. The method of claim 6, further comprising:
allowing access to the website associated with the URL, in response to determining that the URL is not associated with fraudulent activity.

11. The method of claim 6, further comprising:
sending by the processing device, a description of collected business activities associated with the URL to the client application, the description derived from data received from other client applications.

12. A non-transitory machine readable medium, having instructions stored therein, which when executed by a processing device, cause the tracking server to:
receive a source indicator from each of a plurality of remote client applications, wherein the source indicator comprises a first address of a website;
determining a first domain name for the website in view of the first address;
accessing the website using the source indicator to retrieve one or more pages associated with the website;
traversing the one or more pages to extract user information collected by the one or more pages and a second address comprising a destination email address including a second domain name to which the one or more pages send the user information;
in response to a determination that the second domain name is different than the first domain name, detect, by the processing device, from each of the plurality remote client applications, a respective indication of a fraudulent activity, wherein the fraudulent activity comprises forwarding the user information to the second address;
store, by the processing device, the respective indications of the fraudulent activity in a database associated with the website and aggregating the respective indications with previously received indications of the fraudulent activity from other remote client applications;
generate, by the processing device, a value representing a level of safety associated with the website, the value generated in view of the aggregated indications of the fraudulent activity;
provide, by the processing device, the value representing the level of safety associated with the website to one of the plurality of remote client applications, the one of the plurality of remote client applications to compare the value with a user-created profile to determine whether the website is safe; and
provide, by the processing device, a description of the fraudulent activity for the website derived from data provided by the plurality of remote client applications.

13. The non-transitory machine readable medium of claim 12, the processing device to:
alter a graphical user element in each of the plurality of client applications to indicate fraudulent activity for the website.

14. The non-transitory machine readable medium of claim 12, the processing device to:
retrieve additional information associated with the website, wherein the additional information about the fraudulent activity comprises at least one of a location of the website, the destination of data collected by the website, types of data collected by the website, or types of data the website attempts to store on a user machine.

15. A non-transitory machine readable storage medium, having instructions stored therein, which when executed by a processing device, cause the tracking server to:
receive, at the processing device, a uniform resource locator (URL) from a client application over a network, the URL having a first domain name;

access, by the processing device, a website associated with the URL to retrieve one or more pages associated with the website;

traversing the one or more pages to extract user information collected by the one or more pages and a second address comprising an email address including a second domain name to which the one or more pages send the user information;

in response to determining the second domain name is different than the first domain name, adding an indication of fraudulent activity to an entry for the website in a tracking database, wherein the database comprises aggregated user feedback from a plurality of client applications on the network and aggregated indications of fraudulent activity;

look up the URL in database to determine fraudulent activity associated with the URL, wherein the fraudulent activity comprises forwarding the user information to the second address;

generate by the processing device, an indicator of fraudulent activity representing a level of safety associated with the URL, the indicator generated in view of the aggregated user feedback and the aggregated indications of fraudulent activity;

return, by the processing device, the indicator of fraudulent activity representing the level of safety associated with the URL to the client application over the network prior to access of the URL by the client application, the client application to compare the indicator with a profile created by a user to determine whether the URL is safe; and return, by the processing device, a description of the fraudulent activity for the URL derived from the aggregated user feedback provided by the plurality of client applications.

16. The non-transitory machine readable storage medium of claim 15, the processing device to:

alter a graphical user element in the client application to indicate fraudulent activity for the URL.

17. The non-transitory machine readable storage medium of claim 15, the processing device to:

generate a pop-up to display information about fraudulent activity.

18. The non-transitory machine readable storage medium of claim 15, the processing device to:

prevent access to the website associated with the URL in response to a negative fraud report.

19. The non-transitory machine readable storage medium of claim 15, the processing device to:

allow access to a website associated with the URL, in response to determining that the URL is not associated with fraudulent activity.

20. The non-transitory machine readable storage medium of claim 15, the processing device to:

send a description of collected business activities associated with the URL to the client application, the description derived from data received from other client applications.

* * * * *